(12) United States Patent
Goto et al.

(10) Patent No.: US 6,757,631 B2
(45) Date of Patent: Jun. 29, 2004

(54) METHOD OF AND APPARATUS FOR DETECTING ANGULAR VELOCITY, METHOD OF AND APPARATUS FOR DETECTING ANGLE, NAVIGATION SYSTEM, PROGRAM STORAGE DEVICE, AND COMPUTER DATA SIGNAL EMBODIED IN CARRIER WAVE

(75) Inventors: Seiji Goto, Kawagoe (JP); Isao Endo, Kawagoe (JP); Seiji Imada, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 52 days.

(21) Appl. No.: 10/137,346

(22) Filed: May 3, 2002

(65) Prior Publication Data

US 2002/0165687 A1 Nov. 7, 2002

(30) Foreign Application Priority Data

May 7, 2001 (JP) ........................................ 2001-136516

(51) Int. Cl.[7] ............................................. G06F 19/00
(52) U.S. Cl. ........................................ 702/104; 702/146
(58) Field of Search ............................... 73/1.73, 1.78, 73/1.77, 504.12, 504.16; 701/207; 702/104, 146

(56) References Cited

U.S. PATENT DOCUMENTS

| | | | |
|---|---|---|---|
| 5,216,315 A | * 6/1993 | Terada et al. | 310/329 |
| 5,270,959 A | * 12/1993 | Matsuzaki et al. | 702/93 |
| 5,296,855 A | * 3/1994 | Matsuzaki et al. | 340/988 |
| 5,345,382 A | * 9/1994 | Kao | 702/104 |
| 5,390,123 A | * 2/1995 | Ishikawa | 701/207 |
| 5,597,955 A | 1/1997 | Leger et al. | 73/504.16 |
| 5,747,690 A | 5/1998 | Park et al. | 73/504.12 |
| 6,128,572 A | * 10/2000 | Suzuki | 701/207 |

FOREIGN PATENT DOCUMENTS

| | | | | |
|---|---|---|---|---|
| EP | 0602013 | * | 6/1994 | ........... G01C/21/20 |
| JP | 5-52578 | | 3/1993 | |
| JP | 05052578 | | 3/1993 | |
| JP | 04-068472 | * | 10/1993 | ........... G01C/19/56 |
| JP | 07-266488 | * | 4/1997 | ........... G01C/19/56 |
| JP | 11-155639 | * | 12/2000 | ........... G01P/21/00 |
| JP | 11-337437 | * | 6/2001 | ........... G01C/19/56 |
| JP | 2000-149755 | * | 11/2001 | ........... G01C/21/00 |

* cited by examiner

*Primary Examiner*—John Barlow
*Assistant Examiner*—Douglas N Washburn
(74) *Attorney, Agent, or Firm*—Morgan, Lewis & Bockius LLP

(57) ABSTRACT

A method of detecting an angle is provided with processes of: setting a bias voltage, as a standard voltage, which is an output voltage outputted from an angular velocity sensor (12) under a predetermined condition; and calculating the angle on the basis of a difference between the output voltage and the set or updated standard voltage. It is further provided with processes of storing time data, which indicate a time of setting or updating the standard voltage, in correspondence with standard voltage data; estimating a value of the bias voltage of the angular velocity sensor at each time between times of setting or updating the standard voltage; and correcting the calculated angle on the basis of a difference between a value of the standard voltage used in the calculation process and the estimated value of the bias voltage.

19 Claims, 9 Drawing Sheets

METHOD OF AND APPARATUS FOR DETECTING ANGULAR VELOCITY, METHOD OF AND APPARATUS FOR DETECTING ANGLE, NAVIGATION SYSTEM, PROGRAM STORAGE DEVICE, AND COMPUTER DATA SIGNAL EMBODIED IN CARRIER WAVE

BACKGROUND OF THE INVENTION

1. Field of the Invention

The present invention generally relates to a method of and an apparatus for detecting an angular velocity on the basis of an output voltage of an angular velocity sensor such as a gyro or the like and to a method of and an apparatus for detecting an angle on the basis of the output voltage of the angular velocity sensor such as a gyro or the like. The present invention also relates to a navigation system including the above-mentioned apparatus for detecting an angle, a program storage device and a computer data signal embodiment in a carrier wave, which allow a computer to function as the apparatus for detecting an angle or angular velocity.

2. Description of the Related Art

Conventionally, there is an angular velocity sensor such as a gyro or the like among instruments mounted on various types of movable things, and it is mounted, for example, on a movable body such as a vehicle, an airplane, a rocket, a ship or the like for detecting an angle or an angular velocity, or on a robot for controlling its attitude, or on a video camera for correcting movement of the hand. There is also an apparatus for detecting an angle, which displays or records after calculation of an angle, and further an apparatus for detecting an angular velocity, which displays or records after calculation of an angular velocity, on the basis of an output voltage of the angular velocity sensor in this kind.

For example, an on-vehicle navigation system is equipped with the angular velocity sensor such as a vibration gyro or the like and it calculates a drive azimuth on the basis of its output voltage and displays the calculated drive azimuth on a display map in a predetermined format. Alternatively, it is constructed to calculate a current position by a dead reckoning positioning measurement by using a drive distance obtained from a drive distance sensor or the like in conjunction with the calculated drive azimuth, and to display the calculated current position in a predetermined format on the display map.

The angular velocity sensor in this kind is constructed to set a bias voltage, which is an output voltage outputted when the angular velocity is zero, as a standard voltage and to calculate an angle on the basis of this standard voltage and an output voltage of the angular velocity sensor at an arbitrary time. Alternatively, it is constructed to calculate the angular velocity by how high the output voltage of the angular velocity sensor at the arbitrary time is, including its polarity, with the standard voltage as a standard.

Especially here, as for the angular velocity sensor such as a vibration gyro or the like, its bias voltage changes stepwise by a temperature drift and a start drift. Therefore, if the bias voltage on startup is fixed as the standard voltage, the detected drive azimuth may disadvantageously change gradually in spite of direct advance of a vehicle, for example. To avoid this, Japanese Patent Application Laying Open NO. Hei 5-52578 discloses a method of decreasing effects of the temperature drift or the like by updating the bias voltage, which is the output voltage of the angular velocity sensor, as a new standard voltage when it is detected that a vehicle is stopping on the basis of a vehicle speed obtained from an apparatus for detecting a vehicle speed.

According to the above-mentioned Japanese Patent Application Laying Open NO. Hei 5-52578, the effects of the temperature drift of the bias voltage or the like can be decreased when updating the standard voltage or just after that. However, because the standard voltage is not updated but constant, considering about a period until the standard voltage is updated next time, the effects of a change by the temperature drift of the bias voltage or the like reveal themselves remarkably with time passing by. Moreover, the standard voltage is not updated as long as such a drive condition that the standard voltage can be updated is not obtained. Therefore, as such a period that the standard voltage is not updated becomes longer, the errors of an angle caused by the change by the temperature drift of the bias voltage or the like increase. Consequently, the drive azimuth of a vehicle displayed on a display map departs widely from a road direction depending on the elapsed time from when the standard voltage, which is generally unknown to a driver, is updated, for example, which is a big problem in practice.

Furthermore, a similar problem applies to a general apparatus for detecting an angular velocity equipped with an angular velocity sensor, and the angular velocity to be detected may have errors depending on the elapsed time after updating the standard voltage by the effects of the temperature drift of the bias voltage described above or the like as well.

SUMMARY OF THE INVENTION

It is therefore an object of the present invention to provide a method of and an apparatus for detecting an angular velocity as well as a method of and an apparatus for detecting an angle, which can decrease the errors caused by the change by the start drift, the temperature drift or the like of the bias voltage of the angular velocity sensor such as a gyro, and further a navigation system equipped with the apparatus for detecting an angle, a program storage device and a computer data signal embodiment in a carrier wave, which allow a computer to function as the apparatus for detecting an angle or angular velocity.

The above object of the present invention can be achieved by a method of detecting an angular velocity provided with processes of: setting a bias voltage, as a standard voltage, which is an output voltage outputted from an angular velocity sensor in response to an angular velocity when a predetermined condition is satisfied as well as updating the standard voltage every time the predetermined condition is satisfied; calculating the angular velocity on the basis of the output voltage with using the set or updated standard voltage as a standard; storing time data, which indicate a time of setting or updating the standard voltage, in correspondence with standard voltage data, which indicate a value of the set or updated standard voltage; estimating a value of the bias voltage of the angular velocity sensor at each time between times of setting or updating the standard voltage, as a function of time, on the basis of a plurality of the stored standard voltage data and a plurality of the stored time data; and correcting the angular velocity calculated by the calculating process on the basis of a difference between a value of the standard voltage used in the calculating process and the estimated value of the bias voltage.

According to the method of detecting an angular velocity of the present invention, the bias voltage, which is the output voltage outputted from the angular velocity sensor such as a gyro, is firstly set as the standard voltage when such a predetermined condition that a movable body in various types such as an airplane, a rocket, a ship, a vehicle or the like, or a movable thing such as a robot, a video camera or the like, on which the angular velocity sensor is mounted, is stopping, is straightly advancing or the like is satisfied as an initial condition, for example. Then, after the method of detecting an angular velocity is started, every time this predetermined condition is satisfied, the standard voltage is updated by the setting process. Then, the angular velocity is calculated by the calculating process on the basis of the output voltage with using the set or updated standard voltage as a standard. Normally, the angular velocity is calculated in response to how high the output voltage is, including the positive and negative polarity, with respect to the standard voltage. On the other hand, the time data, which indicate a time of setting or updating the standard voltage, is stored into a memory or the like by the storing process, in correspondence to the standard voltage data, which indicate a value of the set or updated standard voltage, every time the standard voltage is set or updated. Then, the value of the bias voltage of the angular velocity sensor at each time between times of setting or updating the standard voltage is estimated by the estimating process as the function of time. This estimation is performed, under a condition that at least two time data and two standard voltage data corresponding to the time data are stored, on the basis of these standard voltage data and time data. Then, the angular velocity calculated by the calculating process in the past is corrected by the correcting process, on the basis of the difference between the value of the standard voltage used in the calculating process and the above-mentioned estimated value of the bias voltage.

Therefore, within a period while the bias voltage can not be measured, the calculated angular velocity more or less includes errors caused by a change by the start drift, the temperature drift of the bias voltage or the like. However, when the standard voltage is updated next time, i.e., when the bias voltage can be measured next time, the errors caused by the change of the bias voltage can be corrected backward into the past.

Incidentally, the bias voltage value not only in the past but also in the future may be estimated by the estimating process, from the latest time of updating and may be used as the standard voltage in calculating the angular velocity before the correction.

In one aspect of the method of detecting an angular velocity, the method is further provided with a process of judging whether or not the predetermined condition is satisfied, wherein the setting process sets or updates the standard voltage depending on a judgment result in the judging process.

According to this aspect, it is judged by the judging process whether or not the predetermined condition is satisfied such as whether or not the velocity of the movable thing is less than a certain value, whether or not a velocity change is within a constant range, or the like. Then, the standard voltage is set or updated by the setting process, depending on this judgment result in the judging process. Therefore, because the standard voltage can be certainly set or updated when the bias voltage can be newly measured, it is possible to set the standard voltage with a high accuracy.

In another aspect of the method of detecting an angular velocity, the estimating process uses an n function (n-dimensional function) (n is a natural number), which approximates a change of the bias voltage value with respect to time, as the function.

According to this aspect, the estimating process uses an n function or n-dimensional function such as a linear function, i.e., a straight line, a quadratic function, i.e., a parabola, a cubic function or the like as the function. For example, an n function in this kind is obtained by solving simultaneous equations made by n standard voltages in the past and the corresponding times. Moreover, it is possible to estimate a change of the bias voltage value from more standard voltage values, by using the least square method for n+2 or more standard voltage values in the past.

The above object of the present invention can be achieved by a method of detecting an angle provided with processes of: setting a bias voltage, as a standard voltage, which is an output voltage outputted from an angular velocity sensor mounted on a movable thing in response to an angular velocity when a predetermined condition is satisfied, as well as updating the standard voltage every time the predetermined condition is satisfied; calculating the angle of the movable thing on the basis of a difference between the output voltage and the set or updated standard voltage; storing time data, which indicate a time of setting or updating the standard voltage, in correspondence with standard voltage data, which indicate a value of the set or updated standard voltage; estimating a value of the bias voltage of the angular velocity sensor at each time between times of setting or updating the standard voltage, as a function of time, on the basis of a plurality of the stored standard voltage data and a plurality of the stored time data; and correcting the angle calculated by the calculating process on the basis of a difference between a value of the standard voltage used in the calculating process and the estimated value of the bias voltage.

According to the method of detecting an angle of the present invention, the bias voltage, which is the output voltage outputted from the angular velocity sensor such as a gyro, is firstly set as the standard voltage when such a predetermined condition that a movable thing is stopping, is advancing direct, or the like is satisfied as an initial condition, for example. Then, after the method of detecting an angle is started, every time when the predetermined condition is satisfied, the standard voltage is updated by the setting process. Then, the angle of the movable thing (e.g., the travel azimuth or direction of a vehicle) is calculated by the calculating process, on the basis of the difference between the output voltage and the set or updated standard voltage. Normally, a turning angle of the movable thing is calculated by integrating the difference between the output voltage and the standard voltage, and the angle of the movable thing is calculated by adding this turning angle onto the angle before its turning. On the other hand, the time data, which indicate a time of setting or updating the standard voltage, is stored into a memory or the like by the storing process, in correspondence with the standard voltage data, which indicate a value of the set or updated standard voltage, every time when the standard voltage is set or updated. Then, the value of the bias voltage of the angular velocity sensor at each time between times of setting or updating the standard voltage is estimated by the estimating process, as the function of time. Here, this estimation is performed, under a condition that at least two time data and two standard voltage data corresponding to the time data are stored, on the basis of these standard voltage data and time data. Then, the angle calculated by the calculating process in the past is corrected by the correcting process, on the basis of the difference between the value of the standard voltage used in the calculating process and the above-mentioned estimated value of the bias voltage.

Therefore, within a period while the bias voltage can not be measured, the calculated angle includes errors caused by a change by the start drift, the temperature drift of the bias voltage or the like. However, when the standard voltage is updated next time, i.e., when the bias voltage can be measured next time, the errors caused by the change of the bias voltage can be corrected backward into the past.

Incidentally, the bias voltage value not only in the past but also in the future may be estimated by the estimating process, from the latest time of updating and may be used as the standard voltage in calculating the angle before the correction.

In one aspect of the method of detecting an angle, the method is further provided with a process of judging whether or not the predetermined condition is satisfied, wherein the setting process sets or updates the standard voltage depending on a judgment result in the judging process.

According to this aspect, it is judged by the judging process whether or not the predetermined condition is satisfied such as whether or not the velocity of the movable thing is less than a certain value, whether or not a velocity change is within a constant range, or the like. Then, the standard voltage is set or updated by the setting process, depending on this judgment result in the judging process. Therefore, because the standard voltage can be certainly set or updated when the bias voltage can be newly measured, it is possible to set the standard voltage with a high accuracy.

In another aspect of the method of detecting an angle, the estimating process uses an n function (n is a natural number), which approximates a change of the bias voltage value with respect to time, as the function.

According to this aspect, the estimating process uses an n function or n-dimensional function. For example, an n function in this kind is obtained by solving simultaneous equations made by n standard voltages in the past and the corresponding times. Moreover, it is possible to estimate a change of the bias voltage value from more standard voltage values by using the least square method.

In another aspect of the method of detecting an angle, the calculating process converts a value, which is obtained by integrating on a time axis a difference between the output voltage and the set or updated standard voltage to a turning angle of the movable thing and the correcting process corrects the angle by correcting the turning angle in response to a value, which is obtained by integrating on a time axis a difference between the value of the standard voltage value used in the calculating process and the estimated value of the bias voltage.

According to this aspect, it is possible to calculate the turning angle of the movable thing relatively easily by the difference between the output voltage of the angular velocity sensor and the standard voltage by use of an integrating circuit. Further, it is possible to calculate a correction amount to the turning angle relatively easily by the difference between the standard voltage value used in the calculating process and the estimated value of the bias voltage by use of the integrating circuit. Therefore, it is possible to correct the angle on the basis of the corrected turning angle.

The above object of the present invention can be achieved by an apparatus for detecting an angular velocity provided with: a setting device for setting a bias voltage, as a standard voltage, which is an output voltage outputted from an angular velocity sensor in response to an angular velocity when a predetermined condition is satisfied as well as updating the standard voltage every time the predetermined condition is satisfied; a calculating device for calculating the angular velocity on the basis of the output voltage with using the set or updated standard voltage as a standard; a storing device for storing time data, which indicate a time of setting or updating the standard voltage, in correspondence with standard voltage data, which indicate a value of the set or updated standard voltage; an estimating device for estimating a value of the bias voltage of the angular velocity sensor at each time between times of setting or updating the standard voltage, as a function of time, on the basis of a plurality of the stored standard voltage data and a plurality of the stored time data; and a correcting device for correcting the angular velocity calculated by the calculating device on the basis of a difference between a value of the standard voltage used in the calculating device and the estimated value of the bias voltage.

According to the apparatus for detecting an angular velocity of the present invention, the bias voltage, which is the output voltage outputted from the angular velocity sensor, is firstly set as the standard voltage when a predetermined condition is satisfied. Then, after an operation of the apparatus for detecting an angular velocity is started, every time when the predetermined condition is satisfied, the standard voltage is updated by the setting device. Then, the angular velocity is calculated by the calculating device, on the basis of the output voltage with using the set or updated standard voltage as a standard. On the other hand, the time data, which indicate a time of setting or updating the standard voltage, is stored into a memory or the like of the storing device, in correspondence with the standard voltage data, which indicate a value of the set or updated standard voltage, every time when the standard voltage is set or updated. Then, the value of the bias voltage of the angular velocity sensor at each time between times of setting or updating the standard voltage is estimated by the estimating device, as a function of time. This estimation is performed, under a condition that at least two time data and two standard voltage data corresponding to the time data are stored, on the basis of these standard voltage data and time data. Then, the angular velocity calculated by the calculating device in the past is corrected by the correcting device, on the basis of the difference between the value of the standard voltage used in the calculating device and the above-mentioned estimated value of the bias voltage.

Therefore, within a period while the bias voltage can not be measured, the calculated angular velocity includes errors caused by a change by the start drift, the temperature drift of the bias voltage or the like. However, when the standard voltage is updated next time, i.e., when the bias voltage can be measured next time, the errors caused by the change of the bias voltage can be corrected backward into the past.

Incidentally, the bias voltage value not only in the past but also in the future may be estimated by the estimating device, from the latest time of updating and may be used as the standard voltage in calculating the angular velocity before the correction.

In one aspect of the apparatus for detecting an angular velocity, the apparatus is further provided with a judging device for judging whether or not the predetermined condition is satisfied, wherein the setting device sets or updates the standard voltage depending on a judgment result in the judging device.

According to this aspect, it is judged by the judging device whether or not the predetermined condition is satisfied. Then, the standard voltage is set or updated by the setting device, depending on this judgment result in the judging device. Therefore, because the standard voltage can be certainly set or updated when the bias voltage can be newly measured, it is possible to set the standard voltage with a high accuracy.

In another aspect of the apparatus for detecting an angular velocity, the estimating device uses an n function (n is a natural number), which approximates a change of the bias voltage value with respect to time, as the function.

According to this aspect, the process of estimating uses an n function or n-dimensional function. For example, an n function in this kind is obtained by solving simultaneous equations made by n standard voltages in the past and the corresponding time. Moreover, it is possible to estimate a change of the bias voltage value from more standard voltage values by using the least square method for more standard voltage values in the past.

The above object of the present invention can be achieved by an apparatus for detecting an angle provided with: a setting device for setting a bias voltage, as a standard voltage, which is an output voltage outputted from an angular velocity sensor mounted on a movable thing in response to an angular velocity when a predetermined condition is satisfied as well as updating the standard voltage every time the predetermined condition is satisfied; a calculating device for calculating the angle of the movable thing on the basis of a difference between the output voltage and the set or updated standard voltage; a storing device for storing time data, which indicate a time of setting or updating the standard voltage, in correspondence with standard voltage data, which indicate a value of the set or updated standard voltage; an estimating device for estimating a value of the bias voltage of the angular velocity sensor at each time between times of setting or updating the standard voltage, as a function of time, on the basis of a plurality of the stored standard voltage data and a plurality of the stored time data; and a correcting device for correcting the angle calculated by the calculating device on the basis of a difference between a value of the standard voltage used in the calculating device and the estimated value of the bias voltage.

According to the apparatus for detecting an angle of the present invention, the bias voltage, which is the output voltage outputted from the angular velocity sensor, is firstly set as the standard voltage when a predetermined condition is satisfied. Then, after an operation of the apparatus for detecting an angle is started, every time when the predetermined condition is satisfied, the standard voltage is updated by the setting device. Then, the angle of the movable thing (e.g., the travel angle or azimuth of the vehicle) is calculated by the calculating device, on the basis of the difference between the output voltage and the set or updated standard voltage. On the other hand, the time data, which indicate a time of setting or updating the standard voltage, is stored into a memory or the like of the storing device, in correspondence to the standard voltage data, which indicate a value of the set or updated standard voltage, every time when the standard voltage is set or updated. Then, the value of the bias voltage of the angular velocity sensor at each time between times of setting or updating the standard voltage is estimated by the estimating device, as a function of time. Here, this estimation is performed, under a condition that at least two time data and two standard voltage data corresponding to the time data are stored, on the basis of these standard voltage data and time data. Then, the angle calculated by the calculating device in the past is corrected by the correcting device, on the basis of the difference between the value of the standard voltage used in the calculating device and the above-mentioned estimated value of the bias voltage.

Therefore, within a period while the bias voltage can not be measured, the calculated angle includes errors caused by a change by the start drift, the temperature drift of the bias voltage or the like. However, when the standard voltage is updated next time, i.e., when the bias voltage can be measured next time, the errors caused by the change of the bias voltage can be corrected backward into the past.

Incidentally, the bias voltage value not only in the past but also in the future may be estimated by the estimating device, from the latest time of updating and may be used as the standard voltage in calculating the angle before the correction.

In one aspect of the apparatus for detecting an angle, the apparatus is further provided with a judging device for judging whether or not the predetermined condition is satisfied, wherein the setting device sets or updates the standard voltage depending on a judgment result in the judging device.

According to this aspect, it is judged by the judging device whether or not the predetermined condition is satisfied. Then, the standard voltage is set or updated by the setting device, depending on this judgment result in the judging device. Therefore, because the standard voltage can be certainly set or updated when the bias voltage can be newly measured, it is possible to set the standard voltage with a high accuracy.

In another aspect of the apparatus for detecting an angle, the estimating device uses an n function (n is a natural number), which approximates a change of the bias voltage value with respect to time, as the function.

According to this aspect, the process of estimating uses an n function or the like. For example, an n function in this kind is obtained by solving simultaneous equations made by n standard voltages in the past and the corresponding times. Moreover, it is possible to estimate a change of the bias voltage value from more standard voltage values by using the least square method for n+2 or more standard voltage values in the past.

In another aspect of the apparatus for detecting an angle, the calculating device converts a value, which is obtained by integrating on a time axis a difference between the output voltage and the set or updated standard voltage to a turning angle of the movable thing, and the correcting device corrects the angle by correcting the turning angle in response to a value, which is obtained by integrating on a time axis a difference between the value of the standard voltage used in the calculating device and the estimated value of the bias voltage.

According to this aspect, it is possible to calculate the turning angle of the movable thing relatively easily by the difference between the output voltage of the angular velocity sensor and the standard voltage by use of an integrating circuit. Further, it is possible to calculate a correction amount to the turning angle relatively easily by the difference between the standard voltage value used in the calculating device and the estimated value of the bias voltage by use of the integrating circuit. Therefore, it is possible to correct the angle on the basis of the corrected turning angle.

Incidentally, the angular velocity sensor of the present invention described above, is a gyro sensor such as a vibration gyro, a gas rate gyro, an optical fiber gyro, or the like. The angular velocity sensor may be one except the gyro sensor, for example, one of such an arbitrary type that magnitude of the output voltage based on the bias voltage corresponds to the angular velocity. When the angular velocity sensor in which the bias voltage changes more or less with time by the temperature drift, the start drift, or the like, the method of and the apparatus for detecting an angular velocity and the method of and the apparatus for detecting an angle of the present invention are effective.

The above object of the present invention can be achieved by a navigation system provided with: the above-mentioned apparatus for detecting an angle of the present invention (including its various aspects); the angular velocity sensor; and a displaying device for displaying the corrected angle in a predetermined format.

According to the navigation system of the present invention, because it is provided with the above-mentioned apparatus for detecting an angle, even if the bias voltage of the angular velocity sensor changes by the temperature drift or the like, the angle can be detected with a high accuracy. Therefore, the displaying device can display a highly accurate angle (e.g., a drive azimuth of a vehicle).

The above object of the present invention can be also achieved by a program storage device readable by a computer. The program storage device stores a program of instructions to cause the computer to function as at least one portion of the above-described apparatus for detecting an angle of the present invention (including its various aspects).

According to the program storage device, such as a CD-ROM (Compact Disc-Read Only Memory), a ROM, a DVD (DVD Read Only Memory), a floppy disk or the like, of the present invention, the above described apparatus for detecting an angle of the present invention can be relatively easily realized as a computer reads and executes the program of instructions or as it executes the program after downloading the program through communication device. Moreover, the program of instructions can be sent from a central device with an application program required for the navigation or other data such as a map.

The above object of the present invention can be also achieved by another program storage device readable by a computer. The program storage device stores a program of instructions to cause the computer to function as at least one portion of the above-described apparatus for detecting an angular velocity of the present invention (including its various aspects).

According to the program storage device, such as a CD-ROM, a ROM, a DVD, a floppy disk or the like, of the present invention, the above described apparatus for detecting an angular velocity of the present invention can be relatively easily realized as a computer reads and executes the program of instructions or as it executes the program after downloading the program through communication device. Moreover, the program of instructions can be sent from a central device with an application program required for the navigation or other data such as a map.

The above object of the present invention can be also achieved by a computer data signal embodied in a carrier wave and representing a series of instructions for a computer. The series of instructions causes the computer to function as at least one portion of the above-described apparatus for detecting an angle of the present invention (including its various aspects).

According to this computer data signal embodied in the carrier wave of the present invention, as the computer downloads the program in the computer data signal through a computer network or the like, and executes this program, it is possible to realize the above described apparatus for detecting an angle of the present invention.

The above object of the present invention can be also achieved by another computer data signal embodied in a carrier wave and representing a series of instructions for a computer. The series of instructions causes the computer to function as at least one portion of the above-described apparatus for detecting an angular velocity of the present invention (including its various aspects).

According to this computer data signal embodied in the carrier wave of the present invention, as the computer downloads the program in the computer data signal through a computer network or the like, and executes this program, it is possible to realize the above described apparatus for detecting an angular velocity of the present invention.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.

(I) First Embodiment

An apparatus for detecting an angular velocity by using an angular velocity sensor such as a gyro or the like in the first embodiment will be explained with reference to FIG. 1 to FIG. 8.

The apparatus for detecting an angular velocity in the first embodiment is, for example, constructed to include a gyro sensor such as a vibration gyro, a gas gyro, an optical fiber gyro, or the like as an angular velocity sensor, and it is mounted as one instrument on various types of movable bodies such as a vehicle, an airplane, a rocket, a ship or the like, as one example of movable things, and it outputs angular velocity data on the basis of an output voltage of the angular velocity sensor. Alternatively, the apparatus for detecting an angular velocity in the first embodiment is installed into one portion of an on-vehicle navigation system in the third embodiment, as described below, to use it. Moreover, the apparatus for detecting an angular velocity in the first embodiment may be mounted on various types of movable things such as a robot, a video camera, and the like, and may be used for controlling the attitude of a robot, for correcting movement of the hand, respectively.

Figure 1:
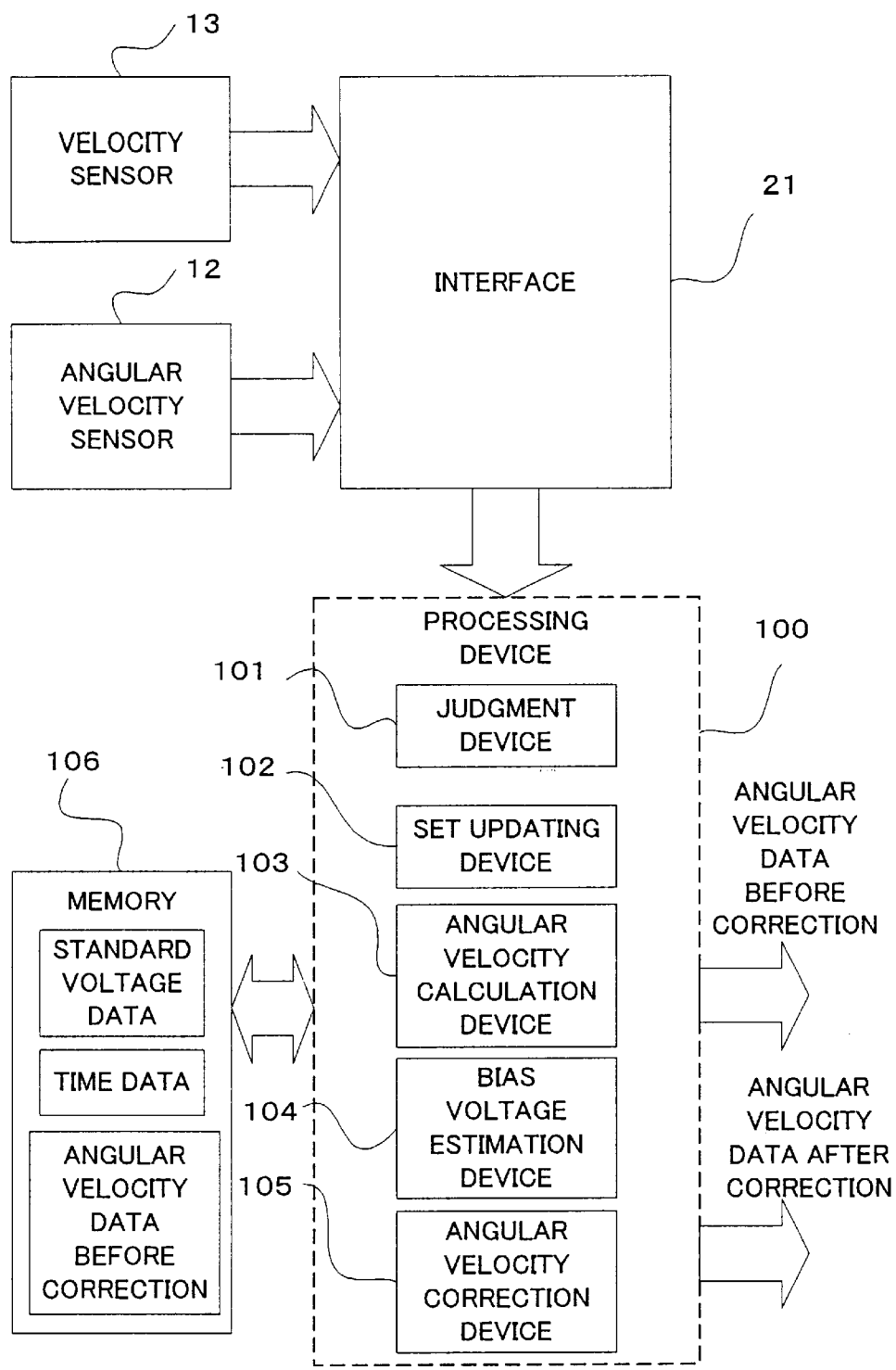
FIG. 1 is a block diagram showing an apparatus for detecting an angular velocity as a first embodiment of the present invention.

In FIG. 1, the apparatus for detecting an angular velocity is provided with an angular velocity sensor 12 and a velocity sensor 13, which are mounted on a movable body such as a vehicle or the like as one example of movable things and is further provided with an interface 21, a processing device 100, and a memory 106, which are connected with those sensors.

The processing device 100 is constructed by a CPU (Central Processing Unit) or the like, in which a judgment device 101, a set-updating device 102, an angular velocity calculation device 103, a bias voltage estimation device 104, and an angular velocity correction device 105 are logically constructed.

Figure 2:
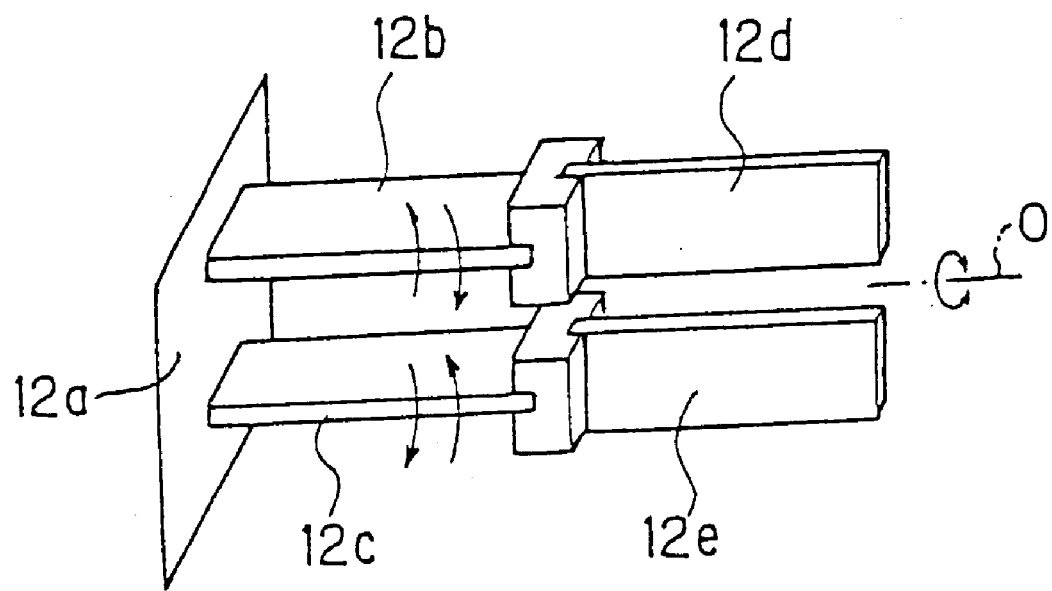
FIG. 2 is a perspective view showing the appearance of an angular velocity sensor included in the apparatus for detecting an angular velocity in the first embodiment.

Here, as shown in FIG. 2, the angular velocity sensor 12 is constructed by a vibration gyro provided with, for example, a base 12a, base crystals 12b and 12c, which are set on one surface of the base 12a, and sense crystals 12d and 12e, which are attached to the respective edge of the base crystals 12b and 12c. The angular velocity sensor 12 constructed by this vibration gyro has a mechanism of generating the output voltage depending on bending of the sense crystals 12d and 12e caused by Coriolis' force applied to them under the condition of their vibration.

Figure 3:
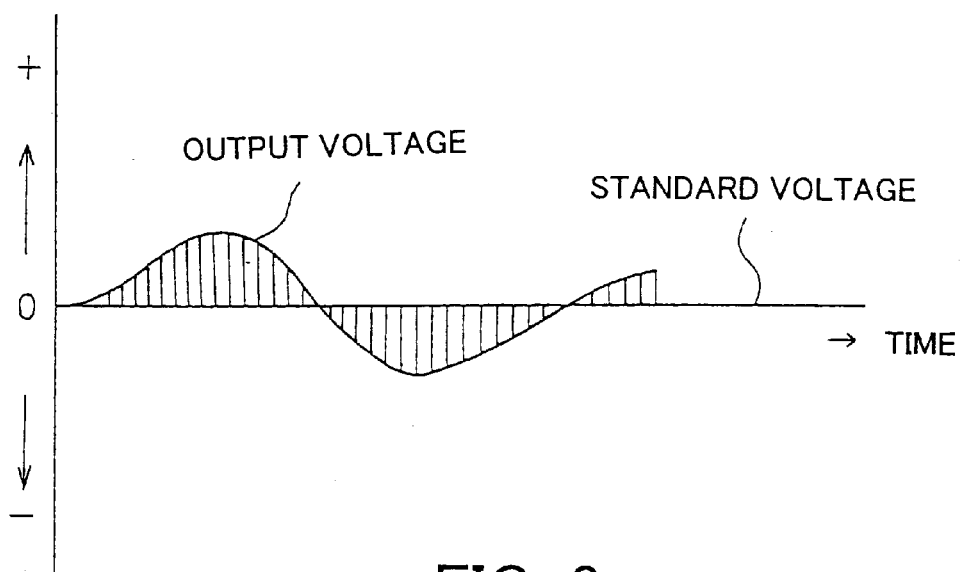
FIG. 3 is a characteristic diagram showing an output voltage of the angular velocity sensor.

Therefore, as shown in FIG. 3, the angular velocity sensor 12 outputs the output voltage, which changes its magnitude including its positive and negative polarity depending on the direction and the magnitude of the added angular velocity, with the bias voltage, which is the output voltage output when the angular velocity is not added, as the center. Hence, if the bias voltage in this kind is set as the standard voltage in advance, it becomes possible to calculate the angular velocity by the degree of the magnitude including the positive and negative polarity of the output voltage, with respect to this standard voltage as the standard.

Consequently in this embodiment, in FIG. 1 again, the judgment device 101 judges as this predetermined condition, such a condition that the angular velocity is not added into the angular velocity sensor 12 and that the standard voltage can be measured, for example, such a condition that a movable body is stopping or is advancing direct as an initial condition, that is, such a condition that the output voltage is coincident with the bias voltage, on the basis of output data of the velocity sensor 13.

The set-updating device 102 sets, as the standard voltage, the bias voltage, which is the output voltage outputted from the angular velocity sensor 12 when the judgment device 101 judges that the predetermined condition is satisfied, and further updates the standard voltage every time this predetermined condition is judged to be satisfied.

In this case, the set-updating device 102 may fix the standard voltage to the newest one (i.e., a constant value) until the standard voltage is updated next time, every time the standard voltage is updated. Alternatively, for the period until the standard voltage is updated next time, the standard voltage can be monotone increased or monotone decreased with time from the newest one depending on change results of the standard voltage in the past. In addition, if any method, which estimates the standard voltage in the future and changes the standard voltage in real time, is employed as a method of setting a standard voltage, as described below in detail, this embodiment is effective, in which the change with time in the past of the standard voltage is estimated on the basis of experimental values of the intermittent standard voltage and a correction is applied onto the error caused by a deviation from the estimated value at each time when the standard voltage was used in the past.

The angular velocity calculation device 103 calculates the angular velocity on the basis of the output voltage with the set or updated standard voltage as a standard and outputs the angular velocity data before correction. More concretely, as shown in FIG. 3, it calculates the angular velocity depending on how high the output voltage is, including the positive and negative polarity, with respect to the newest set or updated standard voltage, for example.

Figure 4:
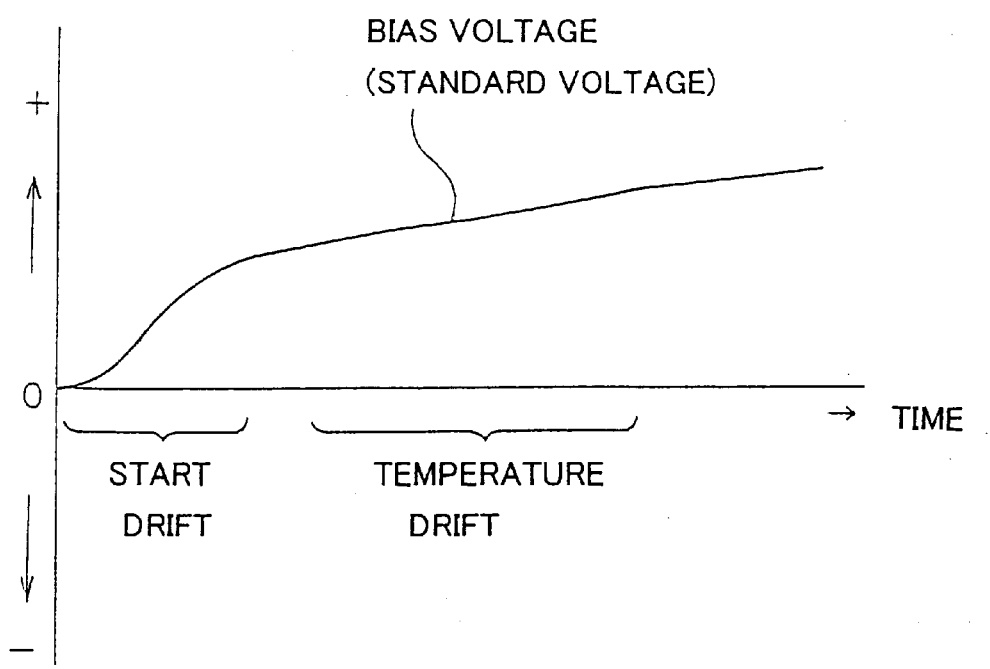
FIG. 4 is a characteristic diagram showing a change of the bias voltage of the angular velocity sensor with time.

Especially here, as shown in FIG. 4, the bias voltage of the angular velocity sensor 12 changes with time by a start drift, a temperature drift, or the like. Therefore, if the standard voltage, which becomes the standard of the output voltage obtained from the angular velocity sensor 12 shown in FIG. 3, is fixed, it is impossible to reflect the magnitude of the output voltage accurately in the angular velocity; that is, errors may occur in the angular velocity calculated depending on a drift of the bias voltage shown in FIG. 4.

Figure 5:
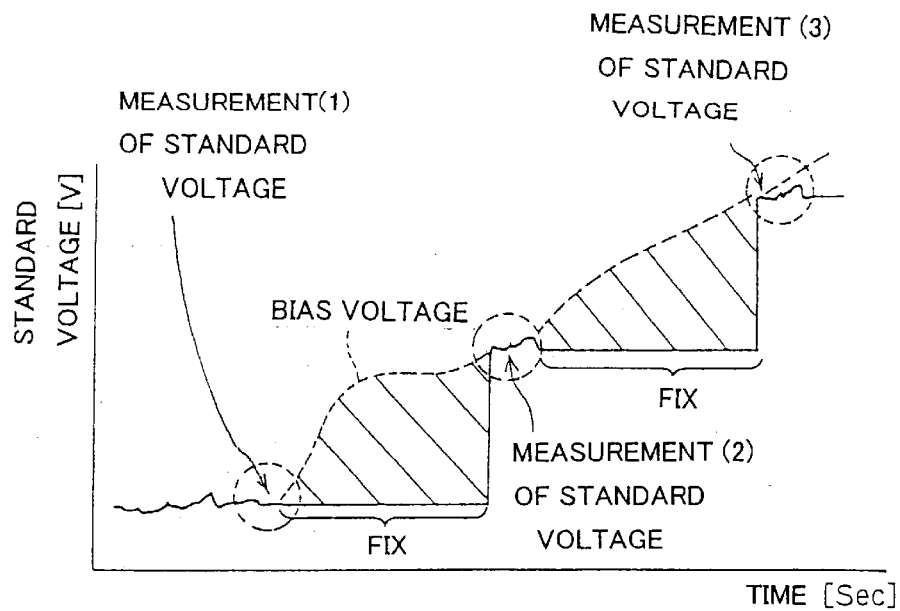
FIG. 5 is a characteristic diagram showing a change of a relationship between the bias voltage and the standard voltage in the case that the standard voltage is fixed to a constant value with time.

More concretely, as shown in FIG. 5, in case that such a construction is employed that, every time the judgment device 101 judges that the standard voltage can be measured, the standard voltage is updated, and that for a period until updating next time the standard voltage is fixed, the angular velocity data, which is outputted from the angular velocity calculation device 103, includes the errors corresponding to the shaded portion (a potential difference at each time).

Figure 6:
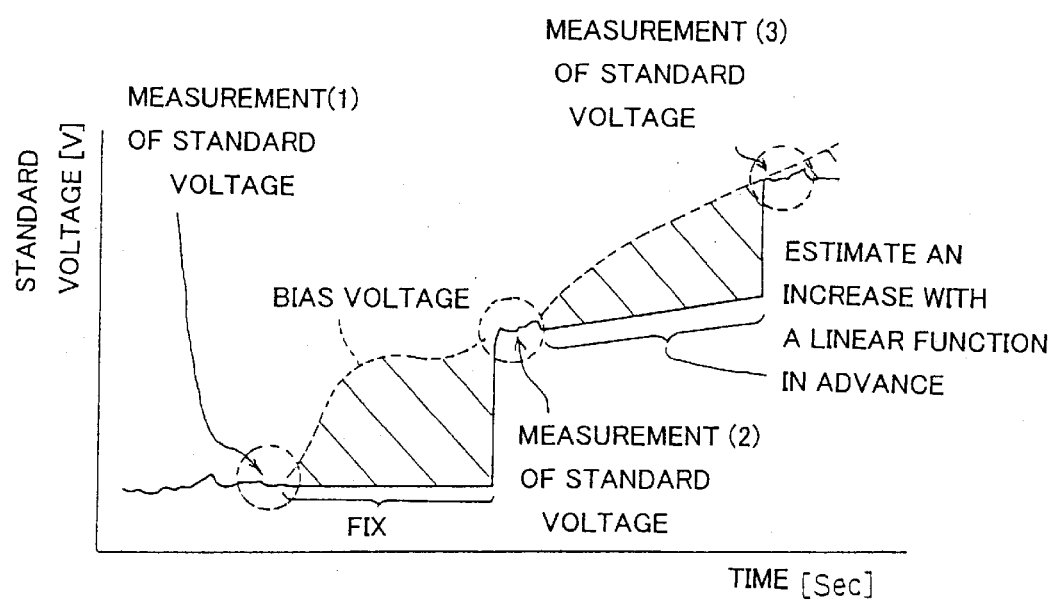
FIG. 6 is a characteristic diagram showing a change of a relationship between the bias voltage and the standard voltage including the case that the standard voltage is fixed to a monotone increasing function with time.

Alternatively, as shown in FIG. 6, for the period until updating next time, even if such a set that the standard voltage is monotone increased at an expected rate is employed, the angular velocity data, which is outputted from the angular velocity calculation device 103, includes the errors corresponding to the shaded portion.

Especially in this embodiment, in FIG. 1 again, the memory 106 stores time data, which indicate a time of setting or updating the standard voltage, in correspondence to standard voltage data, which indicate a value of the set or updated standard voltage, and further stores the angular velocity data before the correction, which is outputted from the angular velocity calculation device 103.

Moreover, the bias voltage estimation device 104 included in the processing device 100 estimates a bias voltage value of the angular velocity sensor at each time between times of setting or updating the standard voltage as a function of time, on the basis of a plurality of standard voltage data and a plurality of time data stored in the memory 106.

Figure 7:
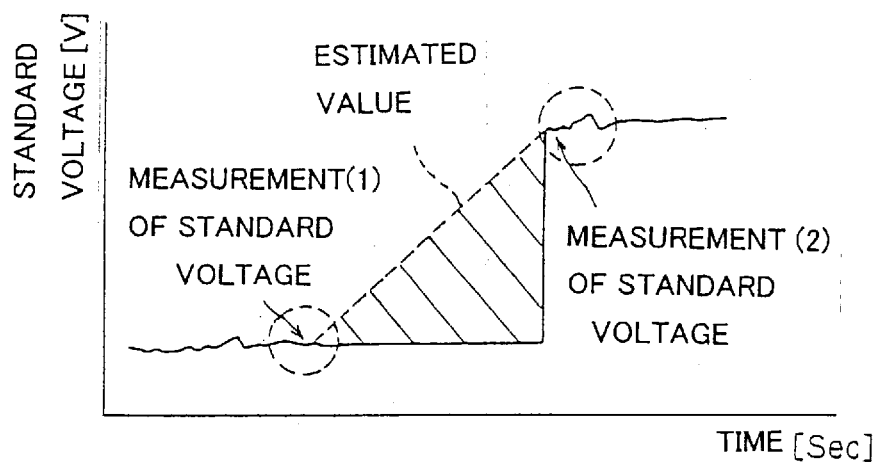
FIG. 7 is a characteristic diagram showing a change of a relationship between an estimated value by a linear function of the bias voltage and the standard voltage in the case that the standard voltage is fixed to a constant value with time in the first embodiment.
Figure 8:
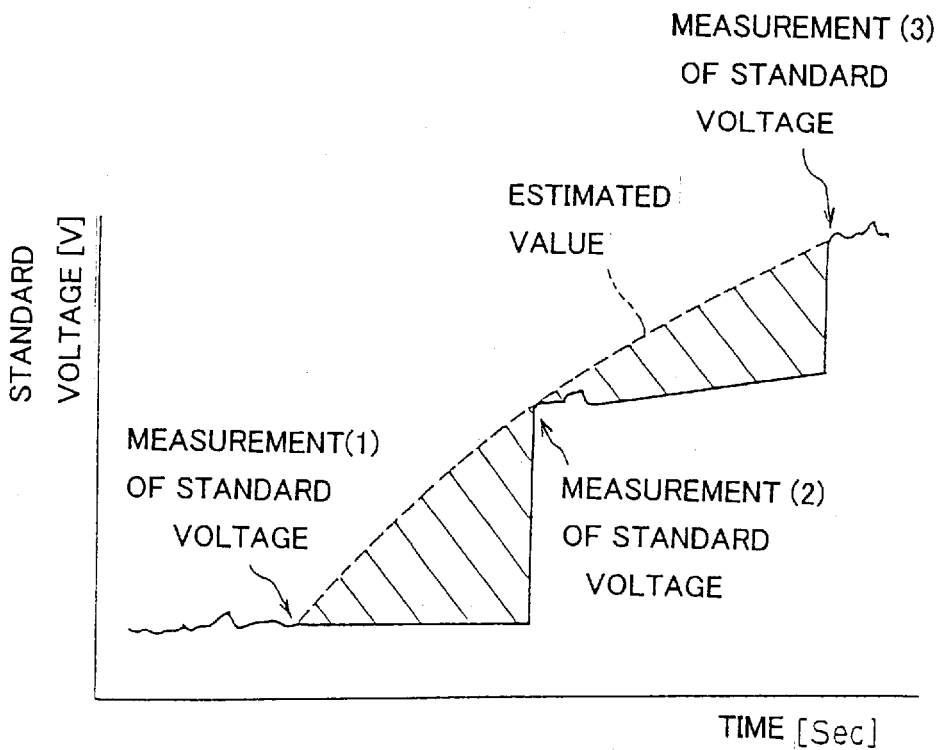
FIG. 8 is a characteristic diagram showing a change of a relationship between an estimated value by an n function of the bias voltage and the standard voltage including the case that the standard voltage is fixed to a monotone increasing function with time in the first embodiment.

More concretely, the bias voltage estimation device 104 makes a linear function shown in FIG. 7, which approximates the bias voltage value changing with time by, for example, the start drift, the temperature drift, or the like, as shown in FIG. 5 and FIG. 6. Alternatively, it makes an n function (n is a natural number), as shown in FIG. 8. These functions are obtained by solving simultaneous equations made by n standard voltage values in the past and their corresponding times. Moreover, it is possible to estimate a change of the bias voltage value from more standard voltage values by using the method of least squares, with respect to n+2 or more standard voltage values in the past.

As described above, when the bias voltage estimation device 104 estimates a time change of the bias voltage (or the standard voltage which can not be detected but was supposed to be used for decreasing errors) in the past as a linear function, an n function or the like, the shaded portion (a potential difference at each time) in FIG. 7 or FIG. 8 is estimated as errors included in the past angular velocity data before the correction.

Lastly, the angular velocity correction device 105 included in the processing device 100 calculates a correction or compensation amount with respect to the angular velocity at each time, which is indicated by the angular velocity data stored in the memory 106, on the basis of a difference, which corresponds to the shaded portion in FIG. 7 or FIG. 8, between (i) the standard voltage value used in calculating the angular velocity data before the correction and (ii) the estimated bias voltage value, and thereby generates the angular velocity data after the correction by adding the correction amount onto the angular velocity at each time.

As described above, the apparatus for detecting an angular velocity in the first embodiment is constructed to output the angular velocity data after the correction at an arbitrary time in the past in unreal time.

As described above, in the first embodiment, within a period while the bias voltage can not be measured as the standard voltage, the calculated angular velocity includes the errors caused by a change by the start drift, the temperature drift or the like of the bias voltage. However, when the standard voltage is updated next time, i.e., when the bias voltage can be measured next time as the standard voltage, the errors caused by this change of the bias voltage can be corrected backward into the past.

Moreover, in the above-mentioned first embodiment, because the judgment device 101 is provided and the standard voltage can be certainly set or updated when the bias voltage can be newly measured, it is possible to set the standard voltage with a high accuracy.

Incidentally, the bias voltage estimation device 104 can estimate the bias voltage value not only in the past but also in the future from the latest time of updating and use it as the standard voltage in calculating the angular velocity data before the correction.

Furthermore, the above-mentioned first embodiment is constructed such that the angular velocity data before the correction is outputted almost in real time, and that when the newest standard voltage is measured, the angular velocity data after the correction is outputted back to the previous updating time of the standard voltage. However, it can be constructed such that when the real-time output is not necessary, only the angular velocity data after the correction can be outputted, recorded, or compiled to be referred later. It can be also constructed such that the correction is collectively performed with respect to the angular velocity data before the correction which have been already recorded.

(II) Second Embodiment

Figure 9:
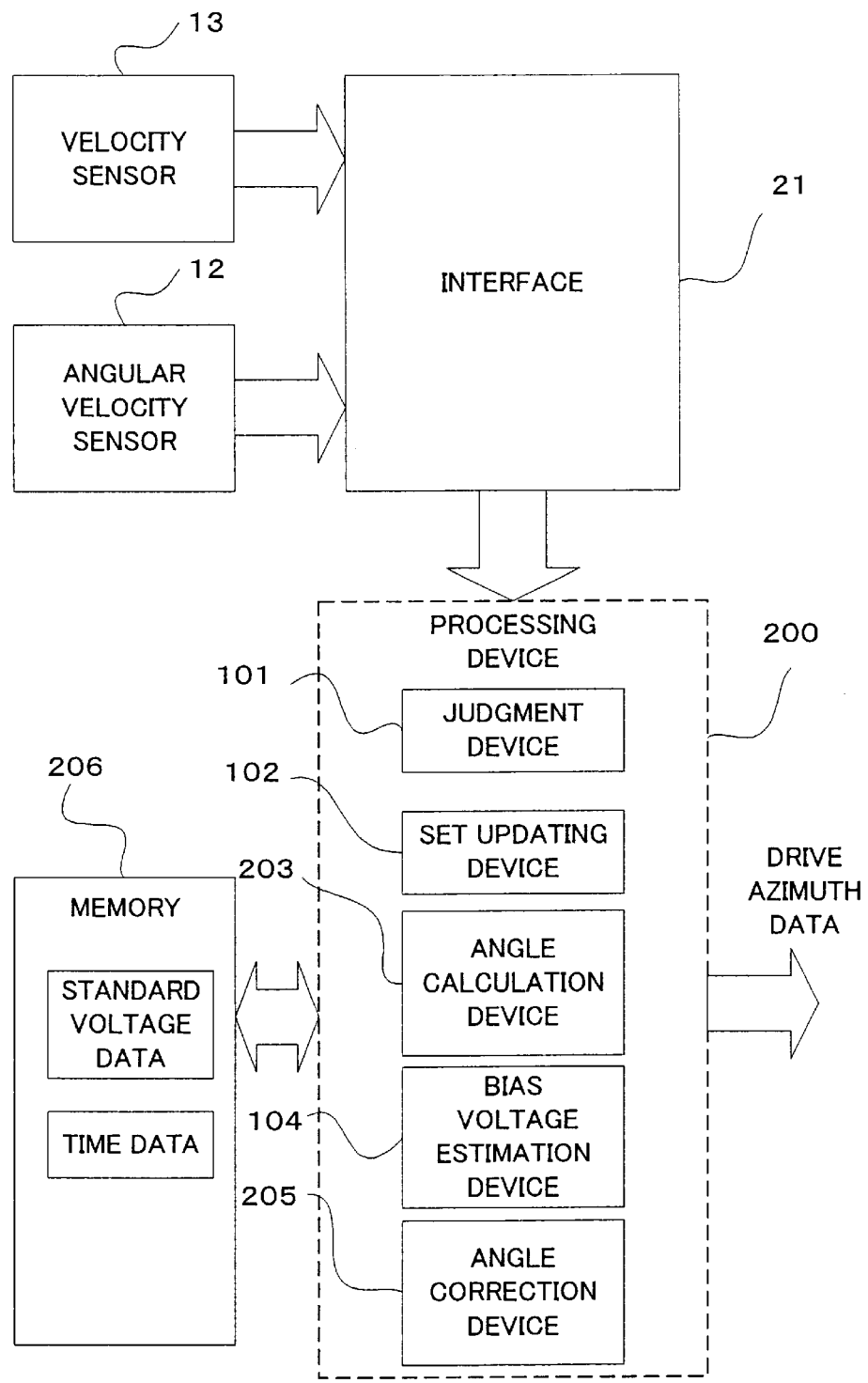
FIG. 9 is a block diagram showing an apparatus for detecting an angle in a second embodiment of the present invention.

An apparatus for detecting an angle in the second embodiment of the present invention will be explained with reference to FIG. 9 in addition to the above-mentioned FIG. 2 to FIG. 8. FIG. 9 is a block diagram showing an apparatus for detecting an angle in the second embodiment. Incidentally, in FIG. 9, the same constitutional elements as those in the first embodiment shown in FIG. 1 carry the same reference numerals and the detailed explanations of them are omitted.

The apparatus for detecting an angle in the second embodiment is constructed to include a gyro sensor such as a vibration gyro, a gas gyro, an optical fiber gyro, or the like as an angular velocity sensor, and it is mounted as one of instruments on various types of movable bodies such as a vehicle, an airplane, a rocket, a ship or the like, as one example of movable things and it outputs angle data on the basis of an output voltage of the angular velocity sensor. Alternatively, the apparatus for detecting an angle in the second embodiment is installed into one portion of an on-vehicle navigation system in the third embodiment, as described below, to use it. Moreover, the apparatus for detecting an angle in the second embodiment may be mounted, for use it, on various types of movable things such as a robot, a video camera, and the like for controlling its attitude, for correcting the movement of the hand, respectively.

In FIG. 9, the apparatus for detecting an angle is provided with an angular velocity sensor 12 and a velocity sensor 13, which are mounted on a movable body such as a vehicle or the like as one example of movable things, and is further provided with an interface 21, a processing device 200, and a memory 206, which are connected with these sensors.

The processing device 200 is constructed by a CPU (Central Processing Unit) or the like, and a judgment device 101, a set-updating device 102, an angle calculation device 203, a bias voltage estimation device 104, and an angle correction device 205 are logically constructed in it.

In this embodiment, in the same manner as the first embodiment, the judgment device 101 judges that the standard voltage can be measured or the like as a predetermined condition. The set-updating device 102 sets the bias voltage, which is the output voltage outputted from the angular velocity sensor 12 shown in FIG. 2, as the standard voltage when this predetermined condition is judged to be satisfied, and it further updates the standard voltage every time this predetermined condition is judged to be satisfied.

In this embodiment, especially, the angle calculation device 203 calculates an angle on the basis of the output voltage from the angular velocity sensor 12 with the set or updated standard voltage as a standard and outputs the angle data. More concretely, as shown in FIG. 3, it calculates a turning angle of a movable body by integrating the difference between the output voltage and the newest set or updated standard voltage and further detects the angle (e.g. a drive azimuth) of the movable body by adding the calculated turning angle onto a standard direction.

Here, as described above, the bias voltage of the angular velocity sensor 12 changes with time by the start drift, the temperature drift or the like. Therefore, if the standard voltage, which is a standard of the output voltage obtained from the angular velocity sensor 12 shown in FIG. 3, is fixed, it is difficult or substantially impossible to reflect the magnitude of the output voltage accurately in the angle. That is, the errors may occur in the angle calculated depending on a drift of the bias voltage shown in FIG. 4.

More concretely, the angle data, which are outputted from the angle calculation device 203, includes the errors corresponding to an area of the shaded portion on the characteristic views of FIG. 5 or FIG. 6.

Consequently, especially in this embodiment, in FIG. 9 again, the memory 206 stores time data, which indicate a time of setting or updating the standard voltage, in correspondence to standard voltage data, which indicate the set or updated standard voltage value.

Moreover, in the same manner as the first embodiment, the bias voltage estimation device 104 included in the processing device 200 estimates a bias voltage value of the angular velocity sensor at each time between times of setting or updating the standard voltage as a function of time on the basis of a plurality of standard voltage data and a plurality of time data stored in the memory 206.

As described above, when the bias voltage estimation device 104 estimates a time change of the bias voltage in the past as a linear function, an n function or the like, the area of the shaded portion in FIG. 7 or FIG. 8 is measured as the error included in the current angle data.

The angle correction device 205 included in the processing device 200 calculates the turning angle as a correction amount with respect to the current angle calculated by the angle calculation device 203, by integrating a difference between (i) the standard voltage value used in calculating the current angle data and (ii) the estimated bias voltage value. Then, it corrects for the angle data by adding this turning angle as the correction amount onto the current angle (e.g. the drive azimuth).

As described above, the apparatus for detecting an angle in the second embodiment is constructed such that every time the standard voltage is updated, it intermittently corrects for errors included in the angles accumulated in the past caused by a drift of the bias voltage. Therefore, it is possible to output the angle data with a high accuracy, in which the accumulation of errors is always retrained, as long as the standard voltage is updated at a certain frequency.

Incidentally, the apparatus for detecting an angle in the second embodiment is constructed such that it outputs the angle data almost in real time while correcting them intermittently. However, it can be also constructed in the same manner as the first embodiment such that the angle data after the correction at an arbitrary time in the past is outputted in unreal time.

(III) Third Embodiment

Figure 10:
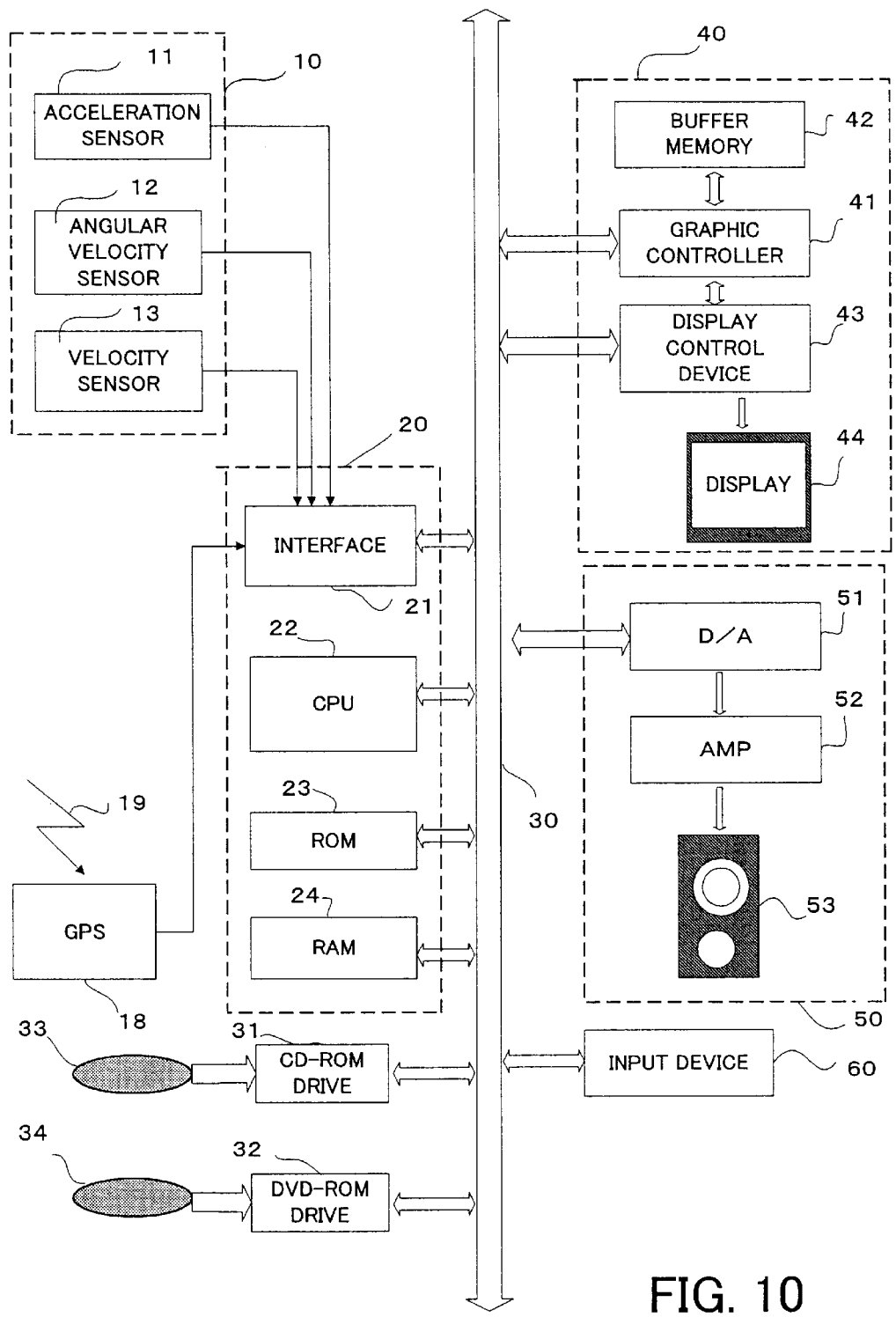
FIG. 10 is a block diagram showing an on-vehicle navigation system in a third embodiment of the present invention.
Figure 11:
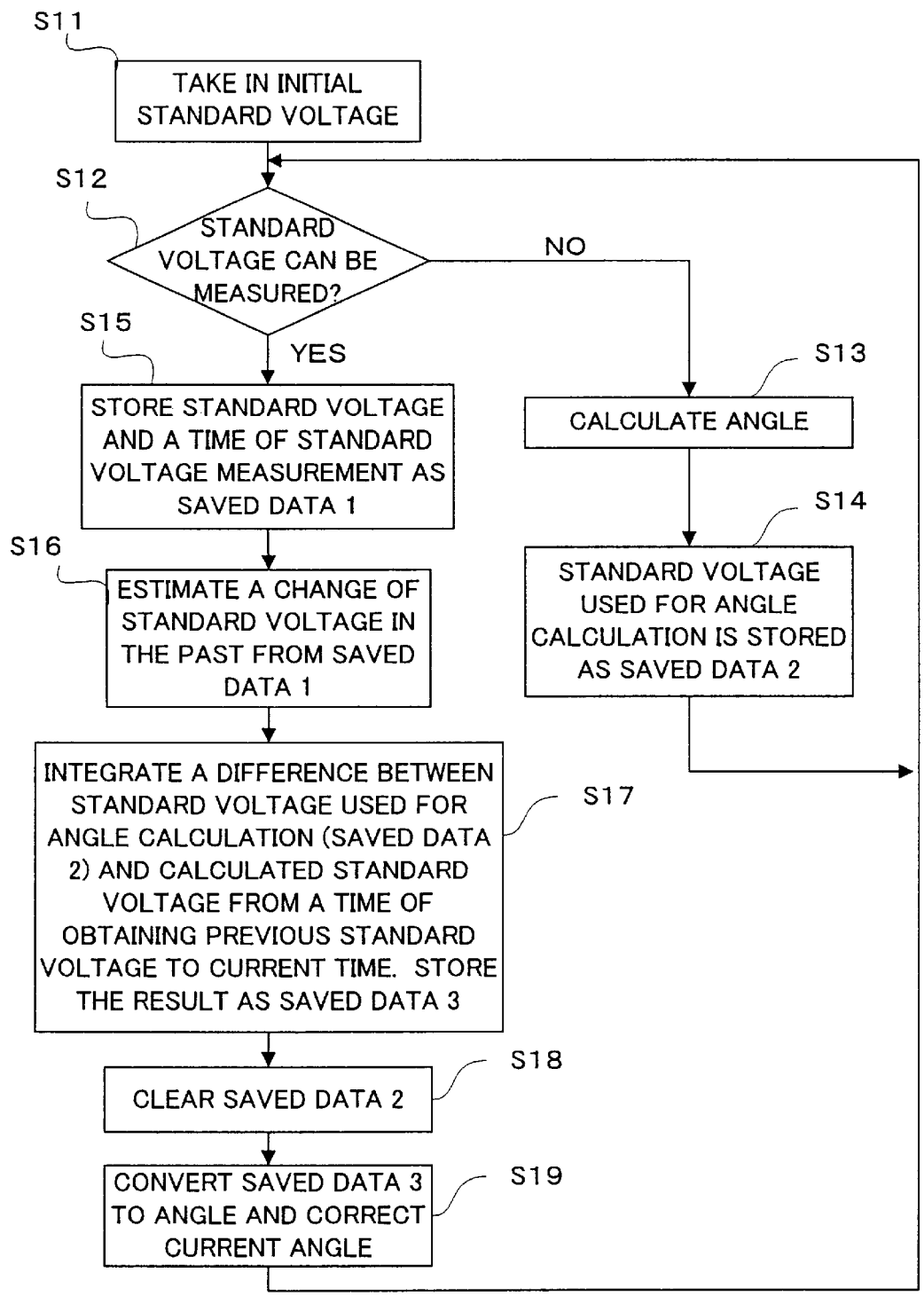
FIG. 11 is a flow chart showing an angle detection operation performed as one portion of a navigation operation in the third embodiment.
Figure 12:
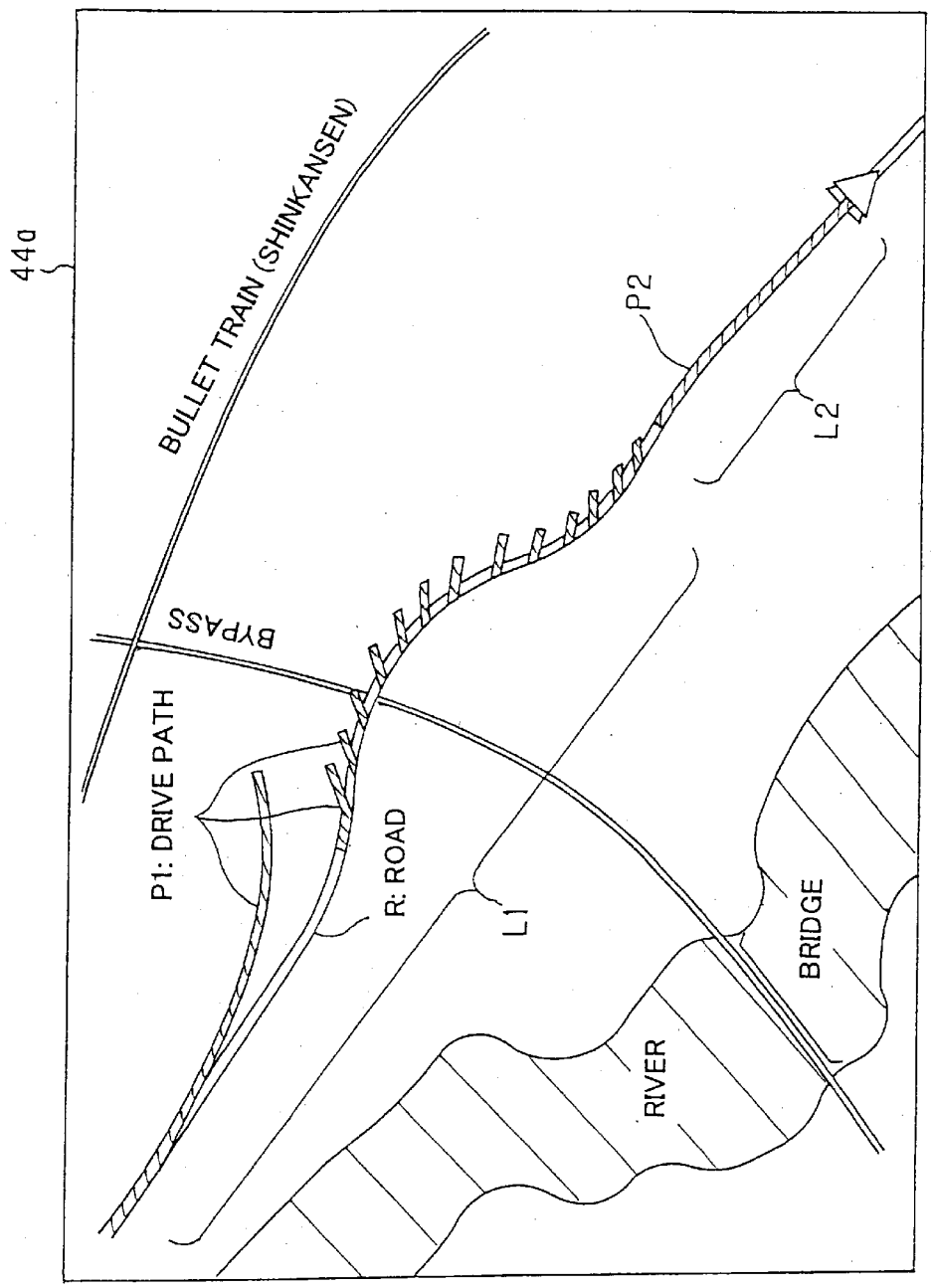
FIG. 12 is a plan view of a display screen showing a display associated with an angle obtained when the angle detection operation is performed by the third embodiment compared to the case without the operation.

Next, an on-vehicle navigation system associated with the third embodiment of the present invention will be explained with reference to FIG. 10 to FIG. 12. FIG. 10 is a block diagram showing an on-vehicle navigation system. FIG. 11 is a flow chart showing an angle detection operation performed as one portion of a navigation operation in the third embodiment. FIG. 12 is a plan view of a display screen showing a display associated with an angle obtained when the angle detection operation is performed by the third embodiment as compared with the case without the operation.

As shown in FIG. 10, the on-vehicle navigation system in the third embodiment is provided with a dead reckoning positioning apparatus 10, a GPS apparatus 18, a system controller 20, a CD-ROM (Compact Disc-Read Only Memory) drive 31, a DVD-ROM (DVD Read Only Memory) drive 32, a display unit 40, an audio output unit 50, and an input device 60.

The dead reckoning positioning apparatus 10 is constructed to include an acceleration sensor 11, an angular velocity sensor 12, and a velocity sensor 13. The acceleration sensor 11, which has, for example, a piezoelectric element, detects an acceleration of a vehicle and outputs acceleration data. The angular velocity sensor 12, which has, for example, a vibration gyro, detects an angular velocity of a vehicle when a direction of the vehicle is changed and outputs angular velocity data and relative azimuth data.

The velocity sensor 13 detects the rotation of a vehicle shaft mechanically, magnetically, or optically and is constructed by a vehicle speed sensor, which generates a vehicle speed pulse as a pulse signal at every rotation for a predetermined angle around the vehicle shaft.

The GPS apparatus 18 is a part to receive a positioning radio wave 19 including signals, which indicate the data for positioning from a plurality of satellites to be used for detection of an absolute position of a vehicle by information about latitude, longitude, or the like.

The system controller 20 includes an interface 21, a CPU (Central Processing Unit) 22, a ROM (Read Only Memory) 23 and a RAM (Random Access Memory) 24 and is constructed to control the whole navigation apparatus.

The interface 21 performs an interface operation with the acceleration sensor 11, the angular velocity sensor 12, the velocity sensor 13, and the GPS apparatus 18. Then from them respectively, it inputs into the system controller 20 the acceleration data, the relative azimuth data, the angular velocity data, GPS measurement data, absolute azimuth data etc. in addition to the vehicle speed pulse. The CPU 22 controls the whole system controller 20. The ROM 23 has a not-illustrated non-volatile memory where a control program etc. for controlling a system controller 20 is stored. The RAM 24 readably stores various types of data such as route data, which are set in advance by a user through the input device 60, and supplies a working area to the CPU 22.

The system controller 20, the CD-ROM drive 31, the DVD-ROM drive 32, the display unit 40, the audio output unit 50, and the input device 60 are mutually connected through a bus line 30.

The CD-ROM drive 31 and the DVD-ROM drive 32, under the control of the system controller 20, read a control program corresponding to each embodiment described below and various types of data such as road data etc. including the number of traffic lane, road width, and the like from a CD 33 and a DVD 34, respectively, and then output them. Incidentally, it is possible to dispose either one of the CD-ROM drive 31 and the DVD-ROM drive 32, and it is also possible to dispose a CD and DVD compatible drive.

The display unit 40, under the control of the system controller 20, displays various types of display data. The display unit 40 is provided with: a graphic controller 41, which controls the whole display unit 40 on the basis of control data transmitted from the CPU 22 through the bus line 30; a buffer memory 42, which is constructed by a memory such as a VRAM (Video RAM) etc. and temporarily memorizes immediately displayable image information; a display control device 43, which controls of display of a display device 44 such as a liquid crystal device, a CRT (Cathode Ray Tube), or the like on the basis of image data outputted from the graphic controller 41; and the display device 44. The display device 44 is constructed by a liquid crystal display device etc., on the order of 5 to 10 inches in diagonal length for example and is installed around a front panel inside the vehicle.

The audio output unit 50 is provided with: a D/A (Digital to Analog) converter 51, which performs a D/A conversion of the sound digital data transmitted through the bus line 30 from the CD-ROM drive 31, the DVD-ROM 32, or the RAM 24 etc., under the control of the system controller 20; an amplifier (AMP) 52, which amplifies a sound analog signal outputted from the D/A converter 51; and a speaker 53, which converts the amplified sound analog signal to a sound and outputs it into the vehicle.

The input device 60 is provided with a key, a switch, a button, a remote controller, and so on, to input various types of commands and data. The input device 60 is installed around the display device 44 or the front panel of a main body of the on-vehicle navigation system, which is mounted on the vehicle.

Especially in the third embodiment, the processing device 200 constituting the above-mentioned apparatus for detecting an angle in the second embodiment is constructed by the CPU 22, which executes a computer program stored in the CD 33, the DVD 34, or the ROM 23.

A method of detecting an angle in the third embodiment is intended to be executed mainly in the CPU 22 and is executed as one portion of a main navigation program which controls the whole on-vehicle navigation system to perform a navigation operation. Therefore, while executing the main navigation system program, operations shown in each flow chart of the embodiments are always being executed. Moreover, the computer program in this kind may be stored in the ROM 23, the CD-ROM 33, or the DVD-ROM 34 and may be downloaded into the RAM 24 or the like through a communication device such as a modem, a cellular phone, or the like. Instead of or in addition to it, map data etc. required for the navigation may be downloaded.

Next, the method of detecting an angle in the on-vehicle navigation system in the third embodiment, as constructed above, will be explained with reference to the flow chart in FIG. 11.

In FIG. 11, an initial standard voltage is firstly taken in from the angular velocity sensor 12, for example, when switching on the on-vehicle navigation system (step S11).

Next, it is judged whether or not the standard voltage can be measured on the basis of output data from the velocity sensor 13, for example (step S12).

As a result of this judgment, if it can not be measured (step S12: NO), an angle (the turning angle) of a vehicle is calculated by integrating a difference between the output of the angular velocity sensor 12 and the newest standard voltage (step S13), and the standard voltage used for this angle calculation is stored in a predetermined area in the RAM 24 or the like as "saved data 2" (step S14). Then, the operational flow returns to step S12.

On the other hand, if it can be measured as a result of the judgment in step S12 (step S12: YES), the measured standard voltage and a time of this measurement are stored in a predetermined area in the RAM 24 or the like as "saved data 1" (step S15). Then, from the "saved data 1" stored in the step S15, a change with time of the bias voltage, which could not be measured in the past but was supposed to be regarded as the standard voltage, is estimated as a function of time (step S16). Then, cumulative errors are calculated by integrating a difference between the standard voltage used in fact in step S13 ("saved data 2") and the estimated standard voltage, from a previous time of measuring the standard voltage to the current time. Then, the cumulative errors are stored in a predetermined area such as the RAM 24 or the like as "saved data 3" (step S17).

Then, the "saved data 2", which have corrected, is cleared to save memory capacity (step S18).

Next, the cumulative errors, as shown by the "saved data 3", accumulated from the previous time of updating the standard voltage to the current time of updating of the standard voltage is converted to angle errors at the turning angle and the current drive azimuth is corrected (step S19). Then the operational flow returns to step S12.

A concrete example of an angle drive azimuth corrected by the third embodiment, as described above, will be explained with reference to FIG. 12. FIG. 12 is a plan view of a display screen 44a of the display device 44 which displays a locus and a location of a vehicle on a display map with the drive azimuth, which is based on the output voltage of the angular vehicle sensor 12, using one element of the dead reckoning positioning measurement as to a drive condition of the vehicle.

As shown by a comparison example in FIG. 12, the errors of the drive azimuth are apparently accumulated and increases depending on a change of the standard voltage, as a vehicle drives, within a section L1 of a road R, where the errors of the drive azimuth are not corrected according to the above-mentioned third embodiment. In other words, a drive path P1 is displayed such that the vehicle drives enormously away from the direction of the road R. Incidentally, this enormous deviation of the drive path P1 from the road R can be corrected by a map matching process. However, the accuracy of the vehicle location on the basis of the dead reckoning positioning measurement and the drive azimuth is basically low in the both cases without correcting the standard voltage errors.

On the contrary, the errors of the drive azimuth are corrected within a section L2 of the road R, where the errors of the drive azimuth are corrected according to the above-mentioned third embodiment, and it maintains a condition that the current position calculated by the dead reckoning positioning measurement is mostly on the road. Therefore, a drive path P2 is displayed mostly along the road R.

As explained above, the on-vehicle navigation system in the third embodiment is provided with the above-mentioned apparatus for detecting an angle of the present invention, so that it is possible to detect the drive azimuth with a high accuracy even if the bias voltage of the angular velocity sensor changes by the start drift, the temperature drift, or the like. Therefore, it is possible to display the drive azimuth with a high accuracy by the display device.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-136516 filed on May 7, 2001 including the specification, claims, drawings and summary is incorporated herein by reference in its entirety.

What is claimed is:

1. A method of detecting an angular velocity comprising processes of:

setting a bias voltage, as a standard voltage, which is an output voltage outputted from an angular velocity sensor in response to an angular velocity when a predetermined condition is satisfied as well as updating the standard voltage every time the predetermined condition is satisfied;

calculating the angular velocity on the basis of the output voltage with using the set or updated standard voltage as a standard;

storing time data, which indicate a time of setting or updating the standard voltage, in correspondence with standard voltage data, which indicate a value of the set or updated standard voltage;

estimating a value of the bias voltage of the angular velocity sensor at each time between times of setting or updating the standard voltage, as a function of time, on the basis of a plurality of the stored standard voltage data and a plurality of the stored time data; and correcting the angular velocity calculated by said calculating process on the basis of a difference between a value of the standard voltage used in said calculating process and the estimated value of the bias voltage.

2. A method according to claim 1, further comprising a process of judging whether or not the predetermined condition is satisfied,
wherein said setting process sets or updates the standard voltage depending on a judgment result in said judging process.

3. A method according to claim 1, wherein said estimating process uses an n function (n is a natural number), which approximates a change of the bias voltage value with respect to time, as the function.

4. A method of detecting an angle comprising processes of:
setting a bias voltage, as a standard voltage, which is an output voltage outputted from an angular velocity sensor mounted on a movable thing in response to an angular velocity when a predetermined condition is satisfied, as well as updating the standard voltage every time the predetermined condition is satisfied;
calculating the angle of the movable thing on the basis of a difference between the output voltage and the set or updated standard voltage;
storing time data, which indicate a time of setting or updating the standard voltage, in correspondence with standard voltage data, which indicate a value of the set or updated standard voltage;
estimating a value of the bias voltage of the angular velocity sensor at each time between times of setting or updating the standard voltage, as a function of time, on the basis of a plurality of the stored standard voltage data and a plurality of the stored time data; and
correcting the angle calculated by said calculating process on the basis of a difference between a value of the standard voltage used in said calculating process and the estimated value of the bias voltage.

5. A method according to claim 4, further comprising a process of judging whether or not the predetermined condition is satisfied,
wherein said setting process sets or updates the standard voltage depending on a judgment result in said judging process.

6. A method according to claim 4, wherein said estimating process uses an n function (n is a natural number), which approximates a change of the bias voltage value with respect to time, as the function.

7. A method according to claim 4, wherein
said calculating process converts a value, which is obtained by integrating on a time axis a difference between the output voltage and the set or updated standard voltage, to a turning angle of the movable thing, and
said correcting process corrects the angle by correcting the turning angle in response to a value, which is obtained by integrating on a time axis a difference between the value of the standard voltage used in said calculating process and the estimated value of the bias voltage.

8. An apparatus for detecting an angular velocity comprising:
a setting device for setting a bias voltage, as a standard voltage, which is an output voltage outputted from an angular velocity sensor in response to an angular velocity when a predetermined condition is satisfied as well as updating the standard voltage every time the predetermined condition is satisfied;
a calculating device for calculating the angular velocity on the basis of the output voltage with using the set or updated standard voltage as a standard;
a storing device for storing time data, which indicate a time of setting or updating the standard voltage, in correspondence with standard voltage data, which indicate a value of the set or updated standard voltage;
an estimating device for estimating a value of the bias voltage of the angular velocity sensor at each time between times of setting or updating the standard voltage, as a function of time, on the basis of a plurality of the stored standard voltage data and a plurality of the stored time data; and
a correcting device for correcting the angular velocity calculated by said calculating device on the basis of a difference between a value of the standard voltage used in said calculating device and the estimated value of the bias voltage.

9. An apparatus according to claim 8, further comprising a judging device for judging whether or not the predetermined condition is satisfied,
wherein said setting device sets or updates the standard voltage depending on a judgment result in said judging device.

10. An apparatus according to claim 8, wherein said estimating device uses an n function (n is a natural number), which approximates a change of the bias voltage value with respect to time, as the function.

11. An apparatus for detecting an angle comprising:
a setting device for setting a bias voltage, as a standard voltage, which is an output voltage outputted from an angular velocity sensor mounted on a movable thing in response to an angular velocity when a predetermined condition is satisfied as well as updating the standard voltage every time the predetermined condition is satisfied;
a calculating device for calculating the angle of the movable thing on the basis of a difference between the output voltage and the set or updated standard voltage;
a storing device for storing time data, which indicate a time of setting or updating the standard voltage, in correspondence with standard voltage data, which indicate a value of the set or updated standard voltage;
an estimating device for estimating a value of the bias voltage of the angular velocity sensor at each time between times of setting or updating the standard voltage, as a function of time, on the basis of a plurality of the stored standard voltage data and a plurality of the stored time data; and
a correcting device for correcting the angle calculated by said calculating device on the basis of a difference between a value of the standard voltage used in said calculating device and the estimated value of the bias voltage.

12. An apparatus according to claim 11, further comprising a judging device for judging whether or not the predetermined condition is satisfied,
wherein said setting device sets or updates the standard voltage depending on a judgment result in said judging device.

13. An apparatus according to claim 11, wherein said estimating device uses an n function (n is a natural number), which approximates a change of the bias voltage value with respect to time, as the function.

14. An apparatus according to claim 11, wherein said calculating device converts a value, which is obtained by integrating on a time axis a difference between the output voltage and the set or updated standard voltage to a turning angle of the movable thing, and said correcting device corrects the angle by correcting the turning angle in response to a value, which is obtained by integrating on a time axis a difference between the value of the standard voltage used in said calculating device and the estimated value of the bias voltage.

15. A navigation system comprising (i) an apparatus for detecting an angle comprising:

a setting device for setting a bias voltage, as a standard voltage, which is an output voltage outputted from an angular velocity sensor mounted on a movable thing in response to an angular velocity when a predetermined condition is satisfied as well as updating the standard voltage every time the predetermined condition is satisfied;

a calculating device for calculating the angle of the movable thing on the basis of a difference between the output voltage and the set or updated standard voltage;

a storing device for storing time data, which indicate a time of setting or updating the standard voltage, in correspondence with standard voltage data, which indicate a value of the set or updated standard voltage;

an estimating device for estimating a value of the bias voltage of the angular velocity sensor at each time between times of setting or updating the standard voltage, as a function of time, on the basis of a plurality of the stored standard voltage data and a plurality of the stored time data; and a correcting device for correcting the angle calculated by said calculating device on the basis of a difference between a value of the standard voltage used in said calculating device and the estimated value of the bias voltage, (ii) the angular velocity sensor, and (iii) a displaying device for displaying the corrected angle in a predetermined format.

16. A program storage device readable by a computer, tangibly embodying a program of instructions executable by the computer to perform method processes of detecting an angle of a movable thing, said method processes comprising:

setting a bias voltage, as a standard voltage, which is an output voltage outputted from an angular velocity sensor mounted on a movable thing in response to an angular velocity when a predetermined condition is satisfied, as well as updating the standard voltage every time the predetermined condition is satisfied;

calculating the angle of the movable thing on the basis of a difference between the output voltage and the set or updated standard voltage;

storing time data, which indicate a time of setting or updating the standard voltage, in correspondence with standard voltage data, which indicate a value of the set or updated standard voltage;

estimating a value of the bias voltage of the angular velocity sensor at each time between times of setting or updating the standard voltage, as a function of time, on the basis of a plurality of the stored standard voltage data and a plurality of the stored time data; and correcting the angle calculated by said calculating process on the basis of a difference between a value of the standard voltage used in said calculating process and the estimated value of the bias voltage.

17. A program storage device readable by a computer, tangibly embodying a program of instructions executable by the computer to perform method processes of detecting an angular velocity of a movable thing, said method processes comprising:

setting a bias voltage, as a standard voltage, which is an output voltage outputted from an angular velocity sensor in response to an angular velocity when a predetermined condition is satisfied as well as updating the standard voltage every time the predetermined condition is satisfied;

calculating the angular velocity on the basis of the output voltage with using the set or updated standard voltage as a standard;

storing time data, which indicate a time of setting or updating the standard voltage, in correspondence with standard voltage data, which indicate a value of the set or updated standard voltage;

estimating a value of the bias voltage of the angular velocity sensor at each time between times of setting or updating the standard voltage, as a function of time, on the basis of a plurality of the stored standard voltage data and a plurality of the stored time data; and correcting the angular velocity calculated by said calculating process on the basis of a difference between a value of the standard voltage used in said calculating process and the estimated value of the bias voltage.

18. A computer data signal embodied in a carrier wave and representing a series of instructions which cause a computer to perform method processes of detecting an angle of a movable thing, said method processes comprising:

setting a bias voltage, as a standard voltage, which is an output voltage outputted from an angular velocity sensor mounted on a movable thing in response to an angular velocity when a predetermined condition is satisfied, as well as updating the standard voltage every time the predetermined condition is satisfied;

calculating the angle of the movable thing on the basis of a difference between the output voltage and the set or updated standard voltage;

storing time data, which indicate a time of setting or updating the standard voltage, in correspondence with standard voltage data, which indicate a value of the set or updated standard voltage;

estimating a value of the bias voltage of the angular velocity sensor at each time between times of setting or updating the standard voltage, as a function of time, on the basis of a plurality of the stored standard voltage data and a plurality of the stored time data; and correcting the angle calculated by said calculating process on the basis of a difference between a value of the standard voltage used in said calculating process and the estimated value of the bias voltage.

19. A computer data signal embodied in a carrier wave and representing a series of instructions which cause a computer to perform method processes of detecting an angular velocity of a movable thing, said method processes comprising:
setting a bias voltage, as a standard voltage, which is an output voltage outputted from an angular velocity sensor in response to an angular velocity when a predetermined condition is satisfied as well as updating the standard voltage every time the predetermined condition is satisfied;
calculating the angular velocity on the basis of the output voltage with using the set or updated standard voltage as a standard;
storing time data, which indicate a time of setting or updating the standard voltage, in correspondence with standard voltage data, which indicate a value of the set or updated standard voltage;

estimating a value of the bias voltage of the angular velocity sensor at each time between times of setting or updating the standard voltage, as a function of time, on the basis of a plurality of the stored standard voltage data and a plurality of the stored time data; and correcting the angular velocity calculated by said calculating process on the basis of a difference between a value of the standard voltage used in said calculating process and the estimated value of the bias voltage.

* * * * *